(12) United States Patent
Pan et al.

(10) Patent No.: US 9,438,945 B1
(45) Date of Patent: Sep. 6, 2016

(54) METHOD FOR CONTINUOUSLY PLAYING VIDEO CLIPS WITHOUT REGENERATION

(71) Applicant: CARNEGIE TECHNOLOGY INVESTMENT LIMITED, Tortola (GB)

(72) Inventors: Chongguang Pan, Dalian (CN); Bingyu Li, Dalian (CN)

(73) Assignee: CARNEGIE TECHNOLOGY INVESTMENT LIMITED, Tortola (GB)

( * ) Notice: Subject to any disclaimer, the term of this patent is extended or adjusted under 35 U.S.C. 154(b) by 12 days.

(21) Appl. No.: 14/630,590

(22) Filed: Feb. 24, 2015

(51) Int. Cl.
| | |
|---|---|
| *H04N 21/262* | (2011.01) |
| *H04N 21/485* | (2011.01) |
| *H04N 21/81* | (2011.01) |
| *H04N 21/8549* | (2011.01) |
| *H04N 21/44* | (2011.01) |
| *H04N 21/234* | (2011.01) |
| *H04N 21/845* | (2011.01) |
| *G06F 17/30* | (2006.01) |
| *H04N 21/2187* | (2011.01) |
| *H04N 21/8547* | (2011.01) |
| *H04N 21/431* | (2011.01) |
| *H04N 21/482* | (2011.01) |

(52) U.S. Cl.
CPC .. *H04N 21/26258* (2013.01); *G06F 17/30017* (2013.01); *H04N 21/2187* (2013.01); *H04N 21/23418* (2013.01); *H04N 21/4316* (2013.01); *H04N 21/44008* (2013.01); *H04N 21/4825* (2013.01); *H04N 21/8133* (2013.01); *H04N 21/8456* (2013.01); *H04N 21/8547* (2013.01); *H04N 21/8549* (2013.01)

(58) Field of Classification Search
CPC ................ H04N 21/4825; H04N 21/26258
See application file for complete search history.

(56) References Cited

U.S. PATENT DOCUMENTS

| | | | |
|---|---|---|---|
| 2015/0181301 A1* | 6/2015 | Bloch | H04N 21/47217 725/41 |
| 2016/0105733 A1* | 4/2016 | Packard | H04N 21/8549 725/32 |

\* cited by examiner

*Primary Examiner* — Benjamin R Bruckart
*Assistant Examiner* — Akshay Doshi
(74) *Attorney, Agent, or Firm* — Leong C. Lei

(57) ABSTRACT

A method for continuously playing video clips without regeneration involves calling on clip records to be continuously played, making an index file according to the order of playback, during replay, finding out a game video of a current play node and its start position and end position, playing the game video to S second before an OUT point, starting to pre-read a video of the next play node and storing it in a memory, and when the current play node is played to its end, reading out the pre-read video from the memory and playing it, thereby achieving seamless playback.

4 Claims, No Drawings

METHOD FOR CONTINUOUSLY PLAYING VIDEO CLIPS WITHOUT REGENERATION

TECHNICAL FIELD OF THE INVENTION

The present invention relates to a method for continuously playing video clips without regeneration.

DESCRIPTION OF THE PRIOR ART

Presently, for live broadcast of a sports game, multiple video cameras are deployed to capture live videos from different viewpoints, and these video sources have to be in-site processed for making clips for immediate replay. In the process, a producer monitoring the captured video sources sets an IN point at the beginning of a critical motion, and sets an OUT point at the end of the very critical motions, so as to define and store a video clip. Then the producer writes the recording site and name of the clip to form a retrievable index keyword, which allows retrieval of the video clip when a corresponding replay is required during the live broadcast. During a session of live broadcast, it is common to collect different video clips of one or more critical motions for serial replay. For doing so, the prerequisite is to find the recorded video clip that meet particular requirements. At the end of one clip, the start point of the next clip has to be found for activating the next clip, and the playback tends to be less smooth at the end of a previous clip to the start of a subsequent clip. For solving this problem, the traditional approach involves downloading the clips, editing the clips in an off-line environment into a new video, and uploading the new video for the live broadcast system to call on for replay. In addition, one machine can only record clips from a single input video. Thus, for a sports game having different videos recorded from multiple viewpoints, multiple machines have to be used in order to make a complete collection of video clips as required by the live broadcast.

SUMMARY OF THE INVENTION

The primary objective of the present invention is to provide a method for continuously playing video clips without regeneration, wherein seamless, continuous playback of plural clips can be achieved without downloading the clips and editing the clips in an off-line environment into a new video, and the method allows forward or backward adjustment of a start position or an end position of a clip according to practical needs, so as to significantly reduce labor costs for processing live broadcast videos taken from multiple viewpoints, and effectively reduce the risk of human disoperation.

According to the present invention, a method for continuously playing video clips without regeneration comprises the following steps:

Step 1: monitoring one or more game videos, setting an IN point and an OUT point when a critical motion occurs, so as to generate a clip record, which at least includes a name of the game video, and information about time-based positions of the IN point and the OUT point in the game video;

Step 2: manually or automatically setting a file name for the clip record, and loading the clip record into a playlist so that the clip record is allowed to be later called on for the replay;

Step 3: in the playlist, according to the file names of the clip records to search N said clip records to be successively played, extracting information from the clip records, and forming an index including N play nodes arranged in a playback order, namely an index including: Play Node 1, Play Node 2, . . . , Play Node N, wherein the contents of each said play node includes the game video name, and information about time-based positions of the IN point and the OUT point in the game video;

Step 4: during the replay, first according to the contents of Play Node 1, namely the game video name 1, and the information 1 about the time-based positions of the IN point and the OUT point in game video, finding out the corresponding game video and the start position and the end position of the clip in the game video, outputting and playing the clip corresponding to Play Node 1, when the clip is played to S seconds before its end, according to the contents of Play Node 2, finding out the corresponding game video and the start position and the end position of the clip in the game video, starting to pre-read video data of the clip corresponding to Play Node 2, and storing the pre-read data in a memory, when the clip corresponding to Play Node 1 is played to its end, directly reading and playing the pre-read data from the memory, and so on, until the clip corresponding to Play Node N is played to its end, thereby achieving seamless playback.

Further, in Step 1, setting OUT point when a critical motion occurs, so as to generate a clip record comprises the following steps:

Step 1: establishing OUT-point setting rules according to actual situations of a certain game, and setting different durations or a single duration for the OUT-point setting rules;

Step 2: viewing the captured game video, and setting an IN point when a critical motion occurs;

Step 3: automatically choosing and applying one said OUT-point setting rule, and obtaining corresponding duration information related to the chosen rule;

Step 4: according to the duration information and a position of the IN point, calculating a position of the OUT point, so as to form a clip record.

Further, if in Step 2, the automatically set file name of the clip record has to be connected to a game information system in Step 1 and a file-name generating strategy has to be set, in Step 2, the game information system, according to progress of the game, provides information about players and motions, according to the information and the present file-name generating strategy to automatically generate the file name of the clip record.

Step 4 involves: opening three video-playing windows, wherein the first video-playing window and the second video-playing window are used, according to the contents of the play node, to find out the corresponding game video and the start position and the end position of the clip in the game video, to play the video clip, and to output video data to the third video-playing window according to a setting, and the third video-playing window serves to play video signals of the live broadcast; during the replay, to direct the first video-playing window according to the contents of the play node currently played, to find out the corresponding game video and the start position and the end position of the clip in the game video, playing the video data from X seconds before the start position, directing the third window to show the clip being played by the first video-playing window when the first video-playing window plays to the start position, when the first video-playing window plays to X seconds before the end position, directing the second video-playing window according to the contents of the next play node to be played, finding out the corresponding game video and the start position and the end position of the clip in the game video, playing the video data from X seconds before the start position, when the second video-playing window plays to the start position, directing the third video-playing window to show the clip being played by the second video-playing window, when the second video-playing window plays to X seconds before the end position, directing the first video-playing window according to the contents of the next play node to be played, finding out the corresponding game video and the start position and the end position of the clip in the game video, playing the video data from X seconds before the start position, directing the third window to show the clip being played by the first video-playing window when the first video-playing window plays to the start position, and so on, until all the play nodes are completely played.

The video-playing window is a thread.

Instead of editing the clips' data into a new video file, the present invention simply calls on the records of the clips to be successively played, and makes an index file according to the order of playback. Thereby, the workload is significantly reduced, and the efficiency of live broadcast can be improved. The index file only records the game video's file name, and the clip's information about time-based positions of the IN point and the OUT point in the game video, so it is possible to tune the clip's start and end positions forward or backward during live broadcast according to need. By comparison, the traditional method is relatively inflexible because once the video file has been made, fine tune is not possible. In other words, the traditional method requires many operators' high concentration, which means great labor costs and material costs. Additionally, the present invention implements a memory that has a read rate typically higher than that of a magnetic disk, and when pre-reading the video data of the next play node, directly stores it in the memory, thereby further ensuring the success of seamless playback. This significantly reduces the operational steps required for making video clips, thereby effectively save labor costs for live broadcast. Particularly, the end time can be generated automatically according to the preset rule for setting an OUT point.

DETAILED DESCRIPTION OF THE PREFERRED EMBODIMENTS

According to the present invention, a method for continuously playing video clips without regeneration comprises the following steps:

Step 1: establishing OUT-point setting rules, according to, for example, actual situations of a certain game, and setting different durations or a single duration for the OUT-point setting rules;

Step 2: capturing at least one stream of a game video;

Step 3: monitoring the captured game video, and setting an IN point when a critical motion occurs;

Step 4: automatically choosing and applying one said OUT-point setting rule, and obtaining corresponding duration information related to the chosen rule;

Step 5: according to the duration information and a position of the IN point, calculating a position of the OUT point, so as to form a clip record, which at least includes a name of the game video, and information about time-based positions of the IN point and the OUT point in the game video;

Step 6: manually or automatically setting a file name for the clip record, and loading the clip record into a playlist so that the clip record is allowed to be later called on for the replay;

wherein in the step of automatically setting the file name of the clip record includes connecting a game information system in Step 1, in which the game information system provides information about players and motions according to progress of the game, and automatically generating the file name of the clip record according to the information combined with a preset file-name generating strategy;

Step 7: in the playlist, according to the file names of the clip records to search N said clip records to be successively played, extracting information from the clip records, forming an index including N play nodes arranged in a playback order, namely an index including: Play Node 1, Play Node 2, . . . , Play Node N, wherein each said play node has contents including the game video name, and the time-based position information about the IN point and the OUT point in the game video;

Step 8: during the replay, first according to the contents of Play Node 1, namely the game video name 1, and the information 1 about the time-based positions of the IN point and the OUT point in game video, finding out the corresponding game video and the start position and the end position of the clip in the game video, outputting and playing the clip corresponding to Play Node 1, when the clip is played to S seconds before its end, according to the contents of Play Node 2, finding out the corresponding game video and the start position and the end position of the clip in the game video, starting to pre-read video data of the clip corresponding to Play Node 2, and storing the pre-read data in a memory, when the clip corresponding to Play Node 1 is played to its end, directly reading and playing the pre-read data from the memory, and so on, until the clip corresponding to Play Node N is played to its end, thereby achieving seamless playback.

Steps 1 through 5 are for preferred implementation of the present invention, but not necessary steps to the present invention. For implementing the present invention, the only requirement is that it includes viewing one or more game videos, setting an IN point and an OUT point when a critical motion occurs, so as to generate a clip record, which at least includes a name of the game video, and information about time-based positions of the IN point and the OUT point in the game video.

Step 8 can be also realized by: opening three video-playing windows or threads. The video-playing window 1 and the video-playing window 2 are used, according to the contents of the play node, to find out the corresponding game video and the start position and the end position of the clip in the game video, to play the video clip, and to output video data to the video-playing window 3 according to a setting. The video-playing window 3 serves to play video signals of the live broadcast. During the replay, the video-playing window 1 is directed, according to the contents of the currently played play node, to find out the corresponding game video and the start position and the end position of the clip in the game video and to play the video data from X seconds before the start position. When the video-playing window 1 plays to the start position, the video-playing window 3 is directed to show the clip being played by the video-playing window 1. When the video-playing window 1 plays to X seconds before the end position, the video-playing window 2 is directed, according to the contents of the next play node to be played, to find out the corresponding game video and the start position and the end position of the clip in the game video, and to play the video data from X seconds before the start position. When the video-playing window 2 plays to the start position, the video-playing window 3 is directed to show the clip being played by the video-playing window 2. When the video-playing window 2 plays to X seconds before the end position, the video-playing window 1 is directed, according to the contents of the next play node to be played, to find out the corresponding game video and the start position and the end position of the clip in the game video, and to play the video data from X seconds before the start position. When the video-playing window 1 plays to the start position, the video-playing window 3 is directed to show the clip being played by the video-playing window 1, and so on, until all the play nodes are completely played. In such a way, seamless, continuous playback of multiple clips can be achieved without using any editing software to rearranging them into a new video file.

The present invention features that based on the technical presupposition of the present invention that replay is realized using the start and end time of a clip directly recorded from a game video instead of capturing and storing video data from the game video, the present invention first call on the record of clips to be played successively, so as to form an index that includes plural play nodes. During the replay, according to the contents of the first play node, the corresponding game video and the clips' start positions and the end positions are found. Then the video data are output and played. When the video data are played to S seconds before the OUT point of the first play node, according to the contents of the second play node, the corresponding game video and the clips' start positions and the end positions are found. Afterward, pre-reading the corresponding second play node's video data is performed and the pre-read data are stored in the memory. When the first play node's contents are played to the end, the pre-read data is directly read out from the memory and played. The same process is repeated until all the play nodes are completely played, thereby achieving seamless playback.

Instead of editing the clips' data into a new video file, the present invention simply calls on the records of the clips to be successively played, and makes an index file according to the order of playback. Thereby, the workload is significantly reduced, and the efficiency of live broadcast can be improved. The index file only records the game video's file name, and the clip's information about time-based positions of the IN point and the OUT point in the game video, so it is possible to tune the clip's start and end positions forward or backward during live broadcast according to need. By comparison, the traditional method is relatively inflexible because once the video file has been made, fine tune is not possible. In other words, the traditional method requires many operators' high concentration, which means great labor costs and material costs. Besides, the present invention implements a memory that has a read rate typically higher than that of a magnetic disk, and when pre-reading the video data of the next play node, directly stores it in the memory, thereby further ensuring the success of seamless playback. This significantly reduces the operational steps required for making video clips, thereby effectively save labor costs for live broadcast. Particularly, the end time can be generated automatically according to the preset rule for setting an OUT point.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

We claim:

1. A method for continuously playing video clips without regeneration, the method comprising the following steps:
   Step 1: monitoring a game video, setting an IN point and an OUT point when a critical motion occurs, so as to generate a clip record, which at least includes a game video name, and an information about time-based positions of the IN point and the OUT point in the game video;
   Step 2: manually or automatically setting a file name for the clip record, and loading the clip record into a playlist so that the clip record is allowed to be later called on for replay;
   Step 3: in the playlist, according to the file names of the clip records to search N said clip records to be successively played, extracting the information from the clip records, and forming an index including N play nodes arranged in a playback order, namely the index including: Play Node 1, Play Node 2, . . . , Play Node N, where each said play node has contents including the game video name, and the time-based positions about the IN point and the OUT point in a corresponding game video;
   Step 4: during replay, first according to the contents of Play Node 1, namely the game video name, and the information about the time-based positions of the IN point and the OUT point in a corresponding game video, finding out the corresponding game video and a start position and an end position of a clip in the corresponding game video, outputting and playing the clip corresponding to Play Node 1 until the clip is played to S seconds before its end, then, according to the contents of Play Node 2, finding out a corresponding game video and the start position and the end position of a clip in a corresponding game video, starting to pre-read the clip corresponding to Play Node 2, and storing the clip corresponding to Play Node 2 in a memory, and, when the clip corresponding to Play Node 1 is played to its end, directly reading and playing the clip corresponding to Play Node 2 from the memory, and so on, until a clip corresponding to Play Node N is played to its end, thereby achieving seamless playback;
   wherein Step 4 further involves:
   opening a first video-playing window, and a second video-playing window, and a third video-playing window,
   during replay, directing the first video-playing window according to the contents of a play node currently played, to find out the corresponding game video and the start position and the end position of the clip in the game video, playing the clip from X seconds before the start position, directing the third video-playing window to show the clip being played by the first video-playing window when the first video-playing window plays to the start position, when the first video-playing window plays to X seconds before the end position, directing the second video-playing window according to the contents of a next play node to be played, finding out a corresponding next game video and the start position and the end position of a next clip in the next game video, playing the next clip from X seconds before the start position, when the second video-playing window plays to the start position, directing the third video-playing window to show the next clip being played by the second video-playing window, when the second video-playing window plays to X seconds before the end position, directing the first video-playing window according to the contents of a further next play node to be played, finding out a corresponding further next game video and the start position and the end position of a further next clip in the further next game video, playing the clip from X seconds before the start position, directing the third window to show the further next clip being played by the first video-playing window when the first video-playing window plays to the start position, and so on, until all play nodes are completely played.

2. The method of claim 1, wherein in Step 1, setting the IN point and the OUT point when a critical motion occurs, so as to generate a clip record, comprises the following steps:

Step 1: establishing OUT-point setting rules and, according to actual situations of a certain game, setting different durations or a single duration for each said OUT-point setting rule;

Step 2: monitoring the game video, and setting the IN point when the critical motion occurs;

Step 3: automatically choosing and applying one said OUT-point setting rule, and obtaining a corresponding duration related to the said OUT-point setting rule; and Step 4: according to the duration and a time-based position of the IN point, calculating a time-based position of the OUT point, so as to form a clip record.

3. The method of claim 1, wherein in Step 2, if the automatically set file name of the clip record has to be related to a game information system in Step 1 and a file-name generating strategy has to be set, in Step 2, the game information system, according to progress of a game, provides an information about players and motions and, according to the information and the file-name generating strategy, automatically generates the file name of the clip record.

4. The method of claim 1, wherein the video-playing window is a thread.

* * * * *